No. 696,917. Patented Apr. 1, 1902.
R. FYFE.
NON-REFILLABLE AND NON-REEMPTIABLE VESSEL FOR LIQUIDS.
(Application filed Sept. 20, 1901.)
(No Model.)
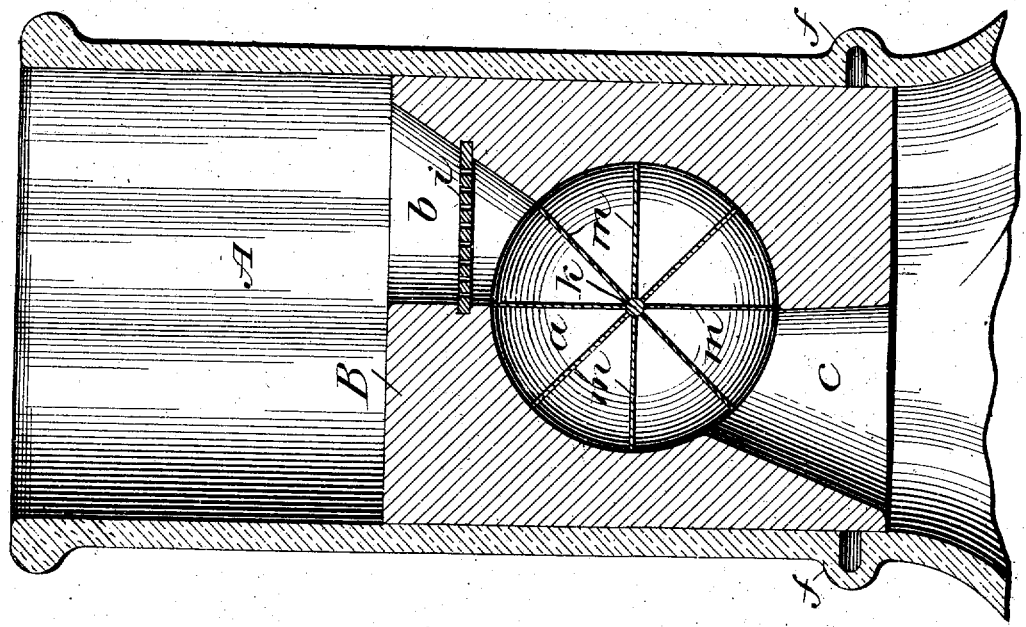
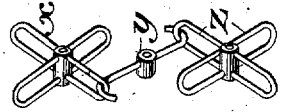
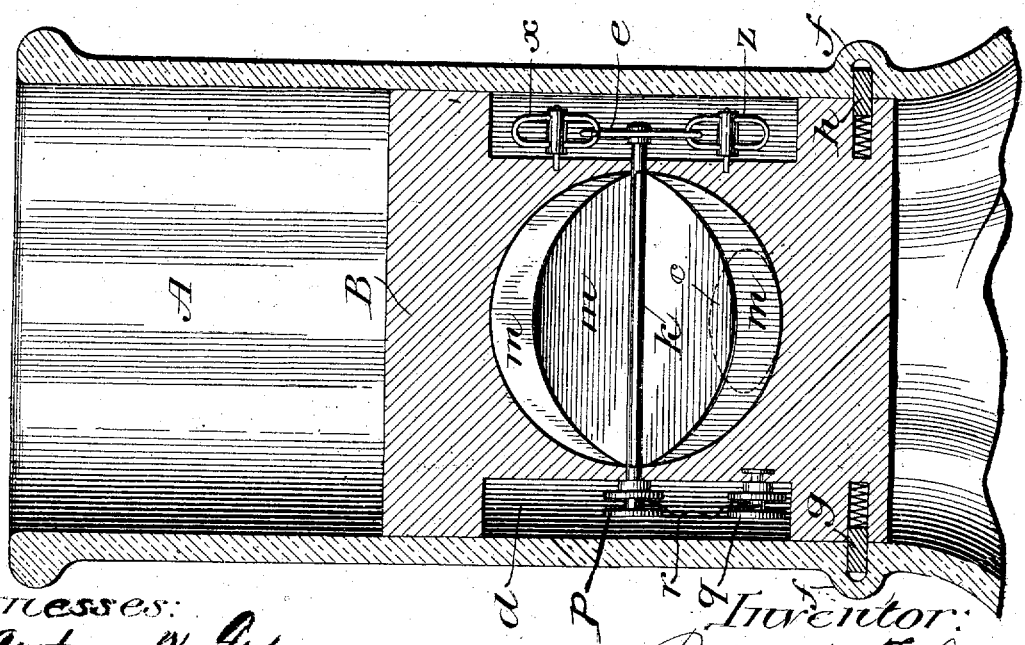
Witnesses:
Arthur N. Fyfe
Charles M. Fyfe
Inventor:
Robert Fyfe

UNITED STATES PATENT OFFICE.

ROBERT FYFE, OF NEW YORK, N. Y.

NON-REFILLABLE AND NON-REEMPTIABLE VESSEL FOR LIQUIDS.

SPECIFICATION forming part of Letters Patent No. 696,917, dated April 1, 1902.

Application filed September 20, 1901. Serial No. 75,979. (No model.)

*To all whom it may concern:*

Be it known that I, ROBERT FYFE, a citizen of the United States, residing at New York, in the county of Kings and State of New York, have invented a new and useful Non-Refillable and Non-Reëmptiable Vessel for Liquids, of which the following is a full specification.

My invention relates to that class of vessels for liquids into the neck or corresponding passage of which is inserted a valve device to allow of the free outflow of originally-inclosed liquid and then render the vessel useless for fraudulent substitution and deception, and I attain these objects by mechanism illustrated in the accompanying drawings, in which—

Figure 1 represents a longitudinal section of the entire device as applied in connection with a round-necked bottle, the section being in line with a transverse shaft $k$. Fig. 2 also represents a longitudinal section, but at right angles to Fig. 1. Fig. 3 shows how the clutch $y$ and the loops $x$ and $y$ engage and interlock.

Similar letters refer to similar parts throughout the several views.

The vessel A constitutes the frame, having in its neck an annular groove $f$, the casing B being inserted into the neck and held in proper position by the spring-plugs $g$ $h$, normally projecting from the side of the casing, but compressible therein for engaging the groove $f$. The casing has a circular interior chamber $a$, having inlet-passage $c$, leading into the body of the bottle, and outlet-passage $b$, leading into the mouth, also two side recesses $d$ and $e$, said inlet and outlet being so constructed as that all liquid will be delivered into the circular interior chamber with pressure only on one side of the blades $m$ $m$ and the outlet-passage being provided with a perforated cap $i$ to protect the mechanism from manipulation. Mounted in the casing is the valve device controlling the inlet and outlet, said device comprising the transverse shaft $k$, carrying blades $m$ $m$ within circular interior chamber $a$ and having its extremities extended into the two recesses $d$ $e$, the end in recess $d$ being furnished with the pulley $p$ rigid thereon, same being connected by means of cord $r$ to a second pulley $q$, of the same dimensions, operating lower down in recess $d$, and the end in recess $e$, carrying rigid thereon the rotary clutch $y$, comprising one or more hook-shaped arms adapted when rotated forward to interlock with the loops $x$ and $y$, and thereby break rotative continuity, and when rotated backward to cause loops $x$ and $y$ to revolve, and thereby clear for continued rotation. The loops $x$, turning on a pivot above the clutch $y$, comprise a ring or revoluble base carrying rigid thereon a series of loops adapted in shape and by location to correspond with the clutch in manner described. The loops $z$ below the clutch are the exact duplicate of loops $x$ and adapted for the same service. This duplicate series of loops is not deemed essential, but is included to provide for possible displacement of any individual loop in either series. The positions of the series of loops $x$ and $z$ in relation to clutch $y$ are determined by the seizing range of the clutch in rotating, and each operating part is therefore located so that one or more of the loops must always be within range of certain seizure by the clutch when it is rotated forward. In this connection rotation of the clutch "forward" means in direction opposed to and "backward" means in direction according with the rotary motion of the blades, as governed by cord $r$ and pulleys $p$ $q$.

My improved vessel is of simple construction, involving practically no change in the existing forms of bottles, &c.

In the drawings I show my device in combination with an ordinary round-necked bottle, but it is equally applicable to vessels of all capacities and with necks of varying shapes. It is used as follows: Assuming, for example, that we are considering a vessel holding a quantity of liquid, which in passing through the casing must rotate the blades a certain specified number of times, the cord $r$ is regulated accordingly by attaching it securely to pulley $q$, then winding it on the pulley that number of times, (which will allow of the same number of blade rotations,) and then fastening the other end of the cord to pulley $p$ and cutting it there. When that is done, the casing, with its mechanism, is pushed down the neck until locked by the spring-plugs $g$ $h$ in the groove $f$. On inverting the vessel the liquid will flow out freely till it is empty, for the pressure on the blades opens the valve, because nothing obstructs the blades from rotating the limited number of times; but when the vessel has been emptied all attempts to refill it will fail, because that would necessitate continued rotation of the blades, such, however, being prevented in one direction by cord $r$ at pulley $q$, and in the reverse direction by clutch $y$ locking in loops $x\,z$, the consequence being a positively-locked valve, which will open neither to outflowing nor to inflowing liquid, in addition to which the casing is also locked in the neck and its operating parts are all securely protected from manipulation. Under these circumstances the only possibility of refilling that remains might be by slow percolation through the valve; but even then the problem of reëmptying would obviously be vastly more difficult, if not absolutely impossible, so that in any case the vessel could not be used for any fraudulent or illicit purpose, for it must also be noted that should a portion only of originally-inclosed liquid be withdrawn and the vessel filled up again by any possible means the action of the valve is always limited so as to allow only of the outflow of the quantity originally inclosed, so that if adulterated a quantity equal to what was substituted would remain locked in the vessel when the quantity originally inclosed had passed out, and thus the adulterator would be no gainer. This important feature of inability to reëmpty in my opinion is not only novel, but of the greatest importance and utility.

I claim as my sole invention, and desire to secure by Letters Patent, the following:

1. The combination of a vessel for liquids, having in the neck or corresponding passage thereof an annular groove, with a casing having compressible spring-plugs adapted to engage said groove, said casing having recesses at each side, and a circular interior chamber having an inlet-passage, leading from the body, and an outlet-passage protected by a perforated cap, leading to the mouth of the vessel, with a transverse shaft carrying blades within said chamber, adapted to rotate by liquid-pressure and to control inlet and outlet passages, said shaft being also provided at one end with a rigid pulley, $p$, which is connected by a cord with another pulley, $q$, so that revolving of the shaft causes the cord to be unwound from pulley $q$, and simultaneously wound onto pulley $p$, and said shaft being further provided at the other end with a rotary clutch and corresponding revoluble loops adapted to prevent reversing revolutions, substantially as shown and described.

2. The combination of a vessel for liquids, having a neck or other corresponding passage, with a transverse shaft carrying blades adapted to rotate by liquid-pressure and to control inlet and outlet, said shaft being also provided with a rigid pulley $p$, which is connected by a cord with another pulley $q$, so that revolving of the shaft causes the cord to be unwound from pulley $q$ and simultaneously wound onto pulley $p$, and said shaft being further provided with a rotary clutch and corresponding revoluble loops adapted to prevent reversing revolutions, substantially as shown and described.

3. The combination of a tube or conduit with a transverse shaft carrying blades adapted to rotate by liquid-pressure and to control inlets and outlets, said shaft being provided with a rigid pulley $p$, which is connected by means of a cord or chain (of length only to allow sufficient revolutions for the valve to open and pass the stipulated quantity) with another pulley $q$ so that revolving of the shaft causes the cord or chain to be unwound from pulley $q$ and simultaneously wound onto pulley $p$, and said shaft being further provided with a rotary clutch and corresponding revoluble loops adapted to prevent reversing revolutions, thereby automatically measuring and cutting off supplies, substantially as shown and described.

4. A device to limit revolutions and check reversing motion of a shaft, comprising a pulley $p$ rigid on said shaft, connected, by means of a cord or chain, of length only to allow of limited number of revolutions with another pulley $q$, so that revolving of the shaft causes the cord or chain to be unwound from pulley $q$, and, simultaneously, wound onto pulley $p$, until checked by the fastened end at pulley $q$; together with a rotary clutch, having one or more hook-shaped arms, carried rigid on said shaft so as to engage one or more of a series of revoluble loops mounted in proper position for reciprocal service, said clutch and revoluble loops being so located in relation to each other as to be always within interlocking range, so that, when said clutch is rotated in one direction, the resulting collision with the series of revoluble loops causes said loops to revolve and allow the clutch to clear for further rotation, but, when said clutch is rotated in the reverse direction, it must interlock with the revoluble loops, and thus break all rotation in that direction substantially as shown and described.

5. A device to limit revolutions of a shaft, comprising a pulley $p$ rigid on said shaft connected by means of a cord or chain of length to allow of limited number of revolutions with another pulley $q$, so that revolving of the shaft causes the cord or chain to be unwound from pulley $q$, and simultaneously, wound onto pulley $p$, until checked by the fastened end at pulley $q$, substantially as shown and described.

6. A non-reëmptiable vessel for liquids, comprising the vessel or frame A, having in its neck the annular groove $f$; the casing B inserted therein and held in position by the spring-plugs $g\,h$ engaging groove $f$, said casing having side recesses $d$ and $e$, a circular interior chamber $a$, outlet-passage $b$, and inlet-passage $c$; the transverse shaft $k$ mounted within said casing, passing through chamber $a$, and extending into recesses $d$ and $e$, said shaft carrying, in chamber $a$, the blades $m\,m$, adapted to rotate by liquid-pressure and to control inlet and outlet, also carrying, in recess $d$, the rigid pulley $p$, connected by the cord $r$ to the other pulley $q$, said cord having first been securely attached, at one end, to pulley $q$ then wound on same, as many times as original contents passing through chamber $a$ rotates the blades $m\ m$, and then cut and attached, at that end, to pulley $p$, said shaft further carrying or engaging, in recess $e$, the rotary clutch $y$ and the loops $x\ z$ adapted to interlock and prevent reverse revolution of the shaft, the whole being adapted so that pressure of the originally-inclosed liquid on the blades causes the shaft to revolve and the blades to rotate until the cord is unwound from pulley $q$ and, simultaneously, wound onto pulley $p$, till the fastened end at pulley $q$ stops rotation, so that original contents can flow out freely, but, should the vessel be afterward wholly or partially refilled, by any means, reëmptying is prevented by restraint of the cord $r$, in recess $d$, and obstruction of the clutch $y$ and loops $x\ z$, in recess $e$, which prevent any further rotation of the blades controlling the outlet, substantially as shown and described.

7. In a non-reëmptiable vessel for liquids the frame A having a neck or similar passage; inserted in said neck the casing B having inlet and outlet passages therein; covering said outlet-passage the protecting perforated cap $i$; attached to said casing the retaining-plugs $g\ h$ engaging in the annular groove $f$; mounted within said casing the shaft $k$; carried on said shaft the blades $m\ m$ controlling inlet and outlet passages; carried on said shaft the pulley $p$ and the clutch $y$; mounted in positions to correspond with said clutch the revoluble loops $x\ z$; connected by the regulating-cord with said pulley $p$, the additional pulley $q$; the cord $r$ connecting said pulleys $p$ and $q$, all adapted for the purposes named, substantially as shown and described.

ROBERT FYFE.

Witnesses:
ARTHUR W. FYFE,
CHARLES M. FYFE.